United States Patent Office 3,166,547
Patented Jan. 19, 1965

3,166,547
POLYMERIZATION OF ALPHA-MONOOLEFINS IN AN AQUEOUS DILUENT
William E. Loeb, Berkeley Heights, N.J., assignor to Union Carbide Corporation, a corporation of New York
No Drawing. Filed Sept. 15, 1959, Ser. No. 840,008
12 Claims. (Cl. 260—94.9)

This invention relates to the polymerization of alpha-olefins. More particularly, this invention is concerned with the use of novel catalyst compositions in converting normally gaseous alpha-monoolefins, such as ethylene and propylene, or mixtures thereof, to high molecular weight polyolefins.

It is known that polymerization of alpha-monoolefins can be brought about by contacting such compounds with a catalyst composition prepared from an ester or halide salt of a transition metal of Group IVA, VA, or VIA of the Periodic Chart of the Atoms and an organometallic compound of a metal of Groups IA, IIA, or IIIB of the Periodic Chart of the Atoms. The transition metal compounds usually employed for such purpose are the transition metal halides, while the organometallic compounds usually employed are the alkyl derivatives of aluminum. Among the transition metal compounds which have been employed may be mentioned titanium trichloride, titanium tetrachloride, vanadium trichloride, vanadium tetrachloride, zirconium tetrachloride, tungsten tetrachloride, tungsten hexachloride and the like, while suitable organometallic compounds which have been employed include triisobutylaluminum, trioctylaluminum, tributylaluminum, triethylaluminum, triisopropylaluminum, tridodecylaluminum, diethylaluminum chloride, diisobutylaluminum chloride, dioctylaluminum chloride, didodecylaluminum chloride, monoisobutylaluminum hydride, diethylaluminum hydride, diisobutylaluminum hydride, dioctylaluminum hydride, didodecylaluminum hydride, diethylberyllium, diisobutylberyllium, dioctylberyllium, ethylberyllium chloride, isobutylberyllium choride, dodecylberyllium chloride, isobutyllithium, cyclohexyllithium, dodecyllithium, diisobutylmagnesium, dioctylmagnesium, didodecylmagnesium, isobutylmagnesium chloride, octylmagnesium chloride, dodecylmagnesium chloride and the like.

Since water readily reacts with the transition metal compounds and organometallic compounds heretofore employed in the polymerization of alpha-monoolefins and destroys their effectiveness to act as cocatalysts, it is usually necessary to observe extreme precautions to keep such compounds free of moisture. Furthermore, since such materials are as subject to alcoholysis as they are to hydrolysis, it is equally necessary to exclude alcohols from contact with them. The techniques designed to exclude water and alcohols must, of course, be employed both in the actual polymerization of alpha-monoolefins and in the preparation and storage of the catalysts themselves. Therefore, such catalysts are usually prepared and stored in an inert anhydrous medium prior to use, and are dispersed in an inert anhydrous diluent during polymerization. The necessity of observing such precautions to keep such catalysts free from water and alcohols both prior to and during polymerization has rendered their use extremely difficult and inconvenient.

Since transition metal compounds and organometallic compounds are subject to hydrolysis and alcoholysis, water and alcohols have not heretofore been employed as a diluent for such catalysts in the polymerization of alpha-monoolefins. The diluents usually employed for such catalysts are the inert liquid hydrocarbons. Such hydrocarbons are relatively expensive and have materially contributed to the cost of the polymerization process.

It has now been discovered that polymerization of alpha-monoolefins can be brought about by contacting said alpha-monoolefins with a novel catalyst composition employing water or an alcohol as a diluent thereof. The successful use of such catalyst composition in an aqueous or alcoholic medium greatly facilitates the polymerization of alpha-monoolefins since the extreme precautions formerly employed to exclude such substances are no longer necessary. Furthermore, by employing water or an alcohol in lieu of the inert liquid hydrocarbons usually employed as diluent in the polymerization of alpha-monoolefins, the cost of such polymerizations have been considerably lessened.

The novel catalyst compositions employed in effecting polymerization of alpha-monoolefins in accordance with the process of the instant invention comprise the products formed by admixing an organic derivative of boron, tin or lead and an inorganic halide salt or hydroxide (for convenience, the term "hydroxide" as used throughout this specification includes hydrated oxides) of a transition metal of Group IVA, VA, or VIA of the Periodic Chart of the Atoms.

The first component of the novel catalyst compositions useful in this invention is an organic derivative of boron, tin or lead which can be graphically depicted by the formula:

$$R_nM$$

wherein R represents a monovalent hydrocarbon radical free of aliphatic unsaturation, including alkyl radicals such as methyl, ethyl, propyl, isopropyl, butyl, isobutyl, amyl, octadecyl and the like, and aryl radicals such as phenyl, tolyl, naphthyl and the like, M represents an atom of boron, tin or lead, and $n$ is an integer having a value equal to the valence of M. Preferably R is an alkyl radical containing no more than 8 carbon atoms. When in the general formula $n$ is greater than 1, R can represent the same or different radicals. Illustrative of the boron, tin and lead derivatives which can be employed in preparing the novel catalyst compositions useful in this invention are such compounds as tributylboron, trimethylboron, triethylboron, tetraethyltin, tetrabutyltin, tetrapropyltin, diethyldibutyltin, tetraethyllead, tetrapropyllead, tetraphenyllead, diethyldibutyllead and the like. These compounds can be employed individually or in various mixtures thereof.

The second component of the novel catalyst compositions useful in this invention is an inorganic halide salt, including fluoride, chloride, bromide and iodide salts, but preferably a chloride salt, or hydroxide of a transition metal of Group IVA, VA, or VIA of the Periodic Chart of the Atoms. The most preferred halide salts and hydroxides are those which are insoluble in water. If desired, when soluble halide salts are employed, a small amount of alkali can be added in order to form an insoluble hydroxide. Typical examples of the transition metal halide salts and hydroxides which can be employed are such compounds as titanium trichloride, titanium tetrachloride, titanium hydroxide, vanadium trichloride, vanadium tetrachloride, niobium pentachloride, niobium hydroxide, chromium dichloride, chromium trichloride, chromium hydroxide, molybdenum trichloride, molybdenum tetrachloride, molybdenum hydroxide, tungsten tetrachloride, tungsten hexachloride, tungsten hydroxide, zirconium tetrachloride, zirconium hydroxide and the like. These compounds can be employed individually or in various mixtures thereof.

The diluent employed for the above-described catalyst compositions in the polymerization of alpha-monoolefins according to the process of the instant invention is water or a saturated aliphatic alcohol containing up to about 18 carbon atoms, such as methanol, ethanol, propanol, isopropanol, butanol, isobutanol, octanol, octadecanol, and the like. Such diluents can be employed individually or in various mixtures thereof. Water is preferred as diluent over alcohols because it is cheaper and more readily available.

While the catalyst components and diluents useful in this invention can be mixed in any desired order, it is preferable to add the transition metal halide salt or hydroxide to the diluent prior to the addition of the organic derivative of boron, tin or lead.

The transition metal halide salts or hydroxides and organic derivatives of boron, tin or lead used in preparing the catalyst compositions useful in this invention can be employed together in ratios varying over rather broad ranges. In general, molar ratios of organic derivative of boron, tin or lead to transition metal halide salt or hydroxide varying from about 0.5:1 to about 10:1 can be advantageously employed. Preferably, for efficiency and economy of operation, the ratio is maintained between 1:1 and 4:1. While polymerization proceeds at molar ratios outside the limits of the broadly disclosed range, no commensurate advantages are obtained by employing such ratios.

The total amount of combined transition metal halide salt or hydroxide and organic derivative of boron, tin or lead dispersed in the diluents employed in accordance with the process of the instant invention is not narrowly critical and can vary over a wide range. Suitable mixtures of catalyst and diluent can be prepared by dispersing sufficient amounts of transition metal halide salt or hydroxide and organic derivative of boron, tin or lead in the diluent to provide a total concentration of from 0.01 percent by weight to 10 percent by weight, preferably from 0.1 percent by weight to 2 percent by weight, of such compounds in the admixture. While polymerization proceeds at concentrations outside the limits of the broadly disclosed range, no commensurate advantages are obtained by employing such concentrations.

The alpha-monoolefins which can be polymerized according to the process of the instant invention are those olefins which have only a single ethylenically-unsaturated carbon-to-carbon linkage, and preferably no more than about 12 carbon atoms. Such compounds can be graphically depicted by the formula:

$$CH_2=CHR'$$

wherein R' represents a hydrogen atom or a monovalent hydrocarbon radical free of aliphatic unsaturation and containing from 1 to about 10 carbon atoms, including alkyl radicals such as methyl, ethyl, propyl, isopropyl, butyl, isobutyl, amyl and the like, and aryl radicals such as phenyl, tolyl, naphthyl and the like. Illustrative of the alpha-monoolefins which can be polymerized in accordance with the process of this invention are such compounds as ethylene, propylene, 1-butene, 1-pentene, 1-hexene, 1-heptene, 1-octene, 1-nonene, 1-decene, 1-dodecene, 3-methyl-1-butene, 4-methyl-1-pentene, 3-methyl-1-pentene, 3-methyl-1-hexene, 4-methyl-1-hexene, 3,4-dimethyl-1-hexene, 4-butyl-1-octene, 5-ethyl-1-decene, styrene and the like. Such compounds can be polymerized individually so as to yield homopolymers, or in combination so as to yield copolymers, terpolymers, etc.

As the alpha-monoolefins which can be polymerized according to the process of the instant invention often exist in the gaseous state, it is customary to effect reaction by bubbling the gas through the catalyst composition. While it is preferable to continuously introduce such gaseous monoolefins into contact with the catalyst compositions of this invention, polymerization can also be effected by initially sealing a fixed amount of such monoolefins in a polymerization reactor with the catalyst compositions of this invention and allowing the reaction to proceed under autogenous pressure, with, if desired, further batchwise additions of monomer. In any event, reactive contact between monoolefin and catalyst composition should be maintained by constant stirring or agitation of the reaction mixture. Care should also be taken to exclude air from contact with the reaction mixture since it ordinarily interferes with polymerization. Such can be accomplished by techniques well known in the art.

When the monoolefins sought to be polymerized exist in the liquid state, the techniques described for polymerizing gaseous monomers can be altered and adapted as may be necessary and suitable for the polymerization of such compounds.

The pressures employed in effecting polymerization according to the process of the instant invention are not narrowly critical and can vary over a wide range. Polymerization is preferably effected at pressures ranging from about 10 atmospheres to about 25 atmospheres; however, pressures both above and below the disclosed preferred range, for example pressures ranging from as low as 0.5 atmosphere to as high as 500 atmospheres, can also be employed whenever it is desirable to do so.

Polymerization according to the process of the instant invention readily occurs at temperatures ranging from as low as 0° C. to as high as 250° C., but is preferably effected at temperatures ranging from about 20° C. to about 150° C. Temperatures both above and below the broadly disclosed range can also be employed; however, no commensurate advantages are obtained by employing temperatures outside the limits of the broadly disclosed range.

After the polymerization reaction is complete, the polymer formed by the reaction can then be separated from the reaction mixture. As the polymer is generally insoluble in the reaction mixture, separation can usually be readily accomplished by filtration. Catalyst residues can be removed from the polymer by washing with suitable solvents.

The polymers produced by the process of this invention can be employed in the many uses commonly made of such compounds, such as in the production of fibers, films, coatings, molded articles and the like.

Unless otherwise specified, all parts and percentages, as used throughout this specification, are by weight. The Periodic Chart of the Atoms referred to throughout this specification is the 1956 Revised Edition published by W. M. Welch Manufacturing Company, 1515 Sedgwick Street, Chicago, Illinois, U.S.A.

The following examples are set forth for purposes of illustration so that those skilled in the art may better understand this invention, and it should be understood that they are not to be construed as limiting this invention in any manner.

EXAMPLE I

*Polymerization of ethylene*

To 800 ml. of distilled water that had been sparged for two minutes with nitrogen were added, in the order stated, 3.1 grams of finely-divided crystalline titanium trichloride and 2.0 ml. of tributylboron. The resulting mixture was then charged to a stainless steel jacketed tubular reactor equipped with inlet and exhaust tubes. The temperature of the reactor was controlled by circulating hot or cold fluids through the jacket. Pressure within the reactor was regulated by means of a motor valve on the downstream side.

After heating the contents of the reactor to 75° C. by circulating hot water through the jacket, the reactor was pressurized to a pressure of 200 p.s.i.g. with ethylene gas. This pressure was maintained for a period of 5 minutes while continuously passing ethylene gas through the reactor at the rate of 20 cubic feet per hour. At the end of this time, all inlet and outlet valves were closed and the reactor was maintained at 75° C. for one hour. After one hour had elapsed, the reactor was cooled by circulating cold water through the jacket. The reactor was then vented to release excess ethylene and a small sample of the reaction mixture was removed from the reactor by means of a valve. The sample contained particles of polyethylene slurried therein.

After the addition of 50 ml. of 0.5 N aqueous sodium hydroxide to the reaction mixture remaining in the reactor, the reaction was allowed to proceed under the conditions described above for an additional one and one-half hours. At the end of this time, the reactor was again cooled by circulating cold water through the jacket. After venting the reactor to release excess ethylene, the reactor was drained and the contents thereof filtered to separate the polyethylene that had been formed by the reaction. The polyethylene was dried at room temperature. The dried polymer, which was identified by infrared analysis, weighed 1.6 grams.

The dried polymer was continuously extracted by heating it with xylene for 8 hours in a Soxhlet extractor. The insoluble portion of the polymer weighed 0.81 gram, while the soluble portion of the polymer weighed 0.77 gram and had a reduced viscosity of 3.2 in decalin.

Reduced viscosity ($I_R$) is a measure of the molecular weight of a polymer, and may be defined by the equation:

$$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and $C$ is the concentration of polymer in said solution in grams per 100 ml. of solution. Measurements were made at 135° C. using decalin as solvent, and a solution of 0.1 gram of polymer per 100 ml. of solution.

EXAMPLE II

Polymerization of ethylene

To 400 ml. of distilled water that had been sparged for two minutes with nitrogen were added, in the order stated, 3.1 grams of finely-divided crystalline titanium trichloride, 450 ml. of 0.06 N aqueous sodium hydroxide, and 2.0 ml. of tributylboron. The resulting mixture was then charged to a stainless steel tubular reactor (described in Example I). After heating the contents of the reactor to 75° C. by circulating hot water through the jacket, the reactor was pressurized to a pressure of 200 p.s.i.g. with ethylene gas. This pressure was maintained for a period of 5 minutes while continuously passing ethylene gas through the reactor at the rate of 20 cubic feet per hour. At the end of this time, all inlet and outlet valves were closed and the reactor was maintained at 75° C. for one hour. After one hour had elapsed, the reactor was cooled by circulating cold water through the jacket. The reactor was then vented to release excess ethylene, and the contents thereof filtered to separate the polyethylene that had been formed by the reaction. The polyethylene was dried at room temperature. The dried polymer, which was identified by infrared analysis, weighed 0.1 gram.

EXAMPLE III

Polymerization of ethylene

To 400 ml. of distilled water were added, in the order stated, 6.0 grams of titanium trichloride and a suspension of 15.5 grams of tetrabutyltin in 100 ml. of distilled water. The resulting mixture and 500 ml. of distilled water were then placed in a nitrogen-purged stainless steel hydrogenation bomb. The bomb was purged and then pressurized to a pressure of 300 p.s.i.g. at room temperature with ethylene gas. The bomb was thn rocked and heated at a temperature of 150° C. for 4½ hours. The pressure within the bomb increased to 680 p.s.i.g. as a result of the heating. After 4½ hours had elapsed, the bomb was cooled and then vented to release excess ethylene. The contents of the bomb were filtered to separate the polyethylene that had been formed by the reaction. The polyethylene was dried at room temperature. The dried polymer, which was identified by infrared analysis, weighed 2 grams.

Polypropylene is produced is a similar manner by substituting propylene for ethylene.

What is claimed is:

1. A process for polymerizing alpha-monoolefins which comprises contacting said alpha-monoolefins in an aqueous medium with a catalyst composition consisting of a compound which can be represented by the general formula:

$$R_nM$$

wherein R is a monovalent hydrocarbon radical free of aliphatic unsaturation, M is a member selected from the group consisting of boron, tin and lead, and $n$ is an integer having a value equal to the valence of M, and a member selected from the group consisting of the inorganic halide salts and hydroxides of titanium.

2. A process for polymerizing alpha-monoolefins having from 2 to about 12 carbon atoms which comprises contacting said alpha-monoolefins in an aqueous medium with a catalyst composition consisting of a compound which can be represented by the general formula:

$$R_nM$$

wherein R is an alkyl radical containing up to 8 carbon atoms, M is a member selected from the group consisting of boron, tin and lead, and $n$ is an integer having a value equal to the valence of M, and a member selected from the group consisting of the inorganic chloride salts and hydroxides of titanium.

3. A process for polylmerizing alpha-monoolefins having from 2 to about 12 carbon atoms which comprises contacting said alpha-monoolefins in an aqueous medium with a catalyst composition consisting of titanium trichloride tributylboron.

4. A process for polymerizing alpha-monoolefins having from 2 to about 12 carbon atoms which comprises contacting said alpha-monoolefins in an aqueous medium with a catalyst composition consisting of titanium trihydroxide and tributylboron.

5. A process for polymerizing alpha-monoolefins having from 2 to about 12 carbon atoms which comprises contacting said alpha-monoolefins in an aqueous medium with a catalyst composition consisting of titanium trichloride and tetrabutyltin.

6. A process for polymerizing alpha-monoolefins having from 2 to about 12 carbon atoms which comprises contacting said alpha-monoolefins in an aqueous medium with a catalyst composition consisting of titanium trihydroxide and tetrabutyltin.

7. A process for polymerizing ethylene which comprises contacting said ethylene in an aqueous medium with a catalyst composition consisting of a compound which can be represented by the general formula:

$$R_nM$$

wherein R is a monovalent hydrocarbon radical free of alipahtic unsaturation, M is a member selected from the group consisting of boron, tin and lead, and $n$ is an integer having a value equal to the valence of M, and a member selected from the group consisting of the inorganic halide salts and hydroxides of titanium.

8. A process for polymerizing ethylene which comprises contacting said ethylene in an aqueous medium with a catalyst composition consisting of a compound which can be represented by the general formula:

$$R_nM$$

wherein R is an alkyl radical containing up to 8 carbon atoms, M is a member selected from the group consisting of boron, tin and lead, and $n$ is an integer having a value equal to the valence of M, and a member selected from the group consisting of the inorganic chloride salts and hydroxides of titanium.

9. A process for polymerizing ethylene which comprises contacting said ethylene in an aqueous medium with a catalyst composition consisting of titanium trichloride and tributylboron.

10. A process for polymerizing ethylene which comprises contacting said ethylene in an aqueous medium with a catalyst composition consisting of titanium trihydroxide and tributylboron.

11. A process for polymerizing ethylene which comprises contacting said ethylene in an aqueous medium with a catalyst composition consisting of titanium trichloride and tetrabutyltin.

12. A process for polymerizing ethylene which comprises contacting said ethylene in an aqueous medium with a catalyst composition consisting of titanium trihydroxide and tetrabutyltin.

References Cited in the file of this patent

UNITED STATES PATENTS

| | | |
|---|---|---|
| 2,586,322 | Franta | Feb. 19, 1952 |
| 2,840,551 | Field et al. | June 24, 1958 |
| 2,868,772 | Ray et al. | Jan. 13, 1959 |
| 3,006,910 | Pritchett et al. | Oct. 31, 1961 |

FOREIGN PATENTS

| | | |
|---|---|---|
| 682,420 | Great Britain | Nov. 13, 1952 |
| 778,639 | Great Britain | July 10, 1957 |
| 534,888 | Belgium | Jan. 31, 1955 |
| 1,157,667 | France | Dec. 30, 1957 |

OTHER REFERENCES

Polymer Reviews: "Linear and Stereoregular Addition Polymers," by Gaylord and Mark, Interscience Publishers Inc., New York, page 128.